US009560186B2

(12) United States Patent
Son et al.

(10) Patent No.: US 9,560,186 B2
(45) Date of Patent: Jan. 31, 2017

(54) WRIST WEARABLE APPARATUS WITH TRANSFORMABLE SUBSTRATE

(71) Applicant: ELECTRONICS AND TELECOMMUNICATIONS RESEARCH INSTITUTE, Daejeon (KR)

(72) Inventors: Yong-Ki Son, Daejeon (KR); Sung-Yong Shin, Daejeon (KR); Il-Yeon Cho, Daejeon (KR); Dong-Woo Lee, Daejeon (KR); Hyung-Cheol Shin, Daejeon (KR); Ji-Eun Kim, Daejeon (KR); Jong-Moo Sohn, Daejeon (KR); Hyun-Tae Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/608,709

(22) Filed: Jan. 29, 2015

(65) Prior Publication Data

US 2015/0222742 A1 Aug. 6, 2015

(30) Foreign Application Priority Data

Feb. 3, 2014 (KR) ........................ 10-2014-0012298

(51) Int. Cl.
*H04W 24/00* (2009.01)
*H04W 4/02* (2009.01)
(Continued)

(52) U.S. Cl.
CPC .......... *H04M 1/72569* (2013.01); *G06F 1/163* (2013.01); *H04B 1/385* (2013.01);
(Continued)

(58) Field of Classification Search
CPC ........ H04W 24/00; H04W 4/025; H04W 4/02; H04W 4/023
(Continued)

(56) References Cited

U.S. PATENT DOCUMENTS

| 7,620,316 | B2 * | 11/2009 | Boillot | G06F 3/017 345/156 |
| 7,978,091 | B2 * | 7/2011 | Boillot | G06F 3/017 340/565 |
| 8,781,715 | B2 * | 7/2014 | Breed | G07C 5/008 340/905 |
| 2007/0120996 | A1 * | 5/2007 | Boillot | G06F 3/017 348/345 |
| 2008/0048878 | A1 * | 2/2008 | Boillot | G06F 3/017 340/686.1 |
| 2009/0326833 | A1 * | 12/2009 | Ryhanen | G06N 3/0675 702/33 |
| 2013/0044215 | A1 | 2/2013 | Rothkopf et al. | |
| 2013/0150076 | A1 * | 6/2013 | Kim | H04W 24/00 455/456.1 |

(Continued)

FOREIGN PATENT DOCUMENTS

| KR | 20-2011-0000416 | 1/2011 |
| KR | 20-0458582 | 2/2012 |

*Primary Examiner* — William D Cumming
(74) *Attorney, Agent, or Firm* — Staas & Halsey LLP

(57) ABSTRACT

The apparatus has a transformable substrate having a flat state, a deformed state, a partially deformed state, and the like, and thus provides a function and a user interface that change according to the deformed state when a user wears the apparatus on his or her wrist and the flat extended state when the user detaches the apparatus from his or her wrist. When the method suggested in the present invention is used, the user can conveniently carry the apparatus on his or her wrist and use the apparatus on or off the wrist as necessary, thereby resolving inconveniences of carrying and using an existing mobile apparatus.

9 Claims, 6 Drawing Sheets

(51) Int. Cl.
*H04M 1/725* (2006.01)
*H04B 1/3827* (2015.01)
*G06F 1/16* (2006.01)

(52) U.S. Cl.
CPC .............. *H04B 2001/3855* (2013.01); *H04B 2001/3861* (2013.01); *H04M 1/7253* (2013.01)

(58) Field of Classification Search
USPC ............... 455/456.7, 456.3, 456.6, 457, 566; 340/565, 686.1, 905
See application file for complete search history.

(56) References Cited

U.S. PATENT DOCUMENTS

| | | | |
|---|---|---|---|
| 2014/0073350 A1* | 3/2014 | Kim ...................... | H04W 4/025 455/456.1 |
| 2014/0113664 A1* | 4/2014 | Kim ...................... | H04W 4/02 455/457 |
| 2014/0162703 A1* | 6/2014 | Ahn ..................... | G01C 21/206 455/456.6 |
| 2014/0256356 A1* | 9/2014 | Shen ..................... | H04W 4/023 455/456.3 |
| 2015/0222742 A1* | 8/2015 | Son .................. | H04M 1/72569 455/566 |

\* cited by examiner

FIG. 4
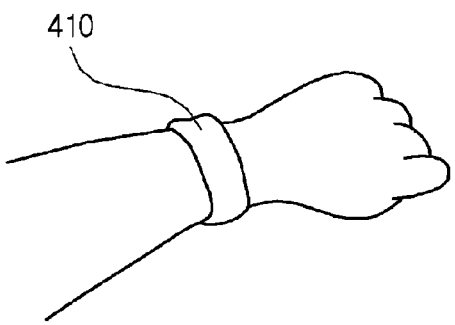
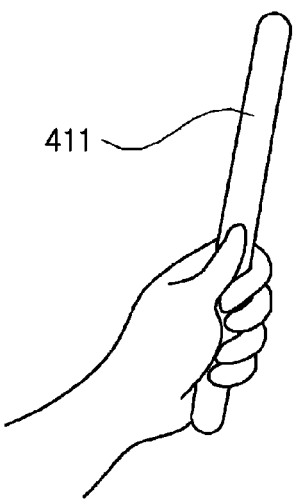
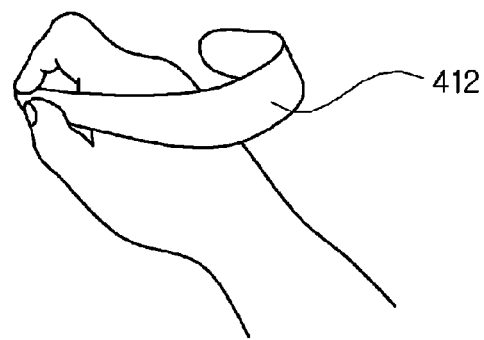

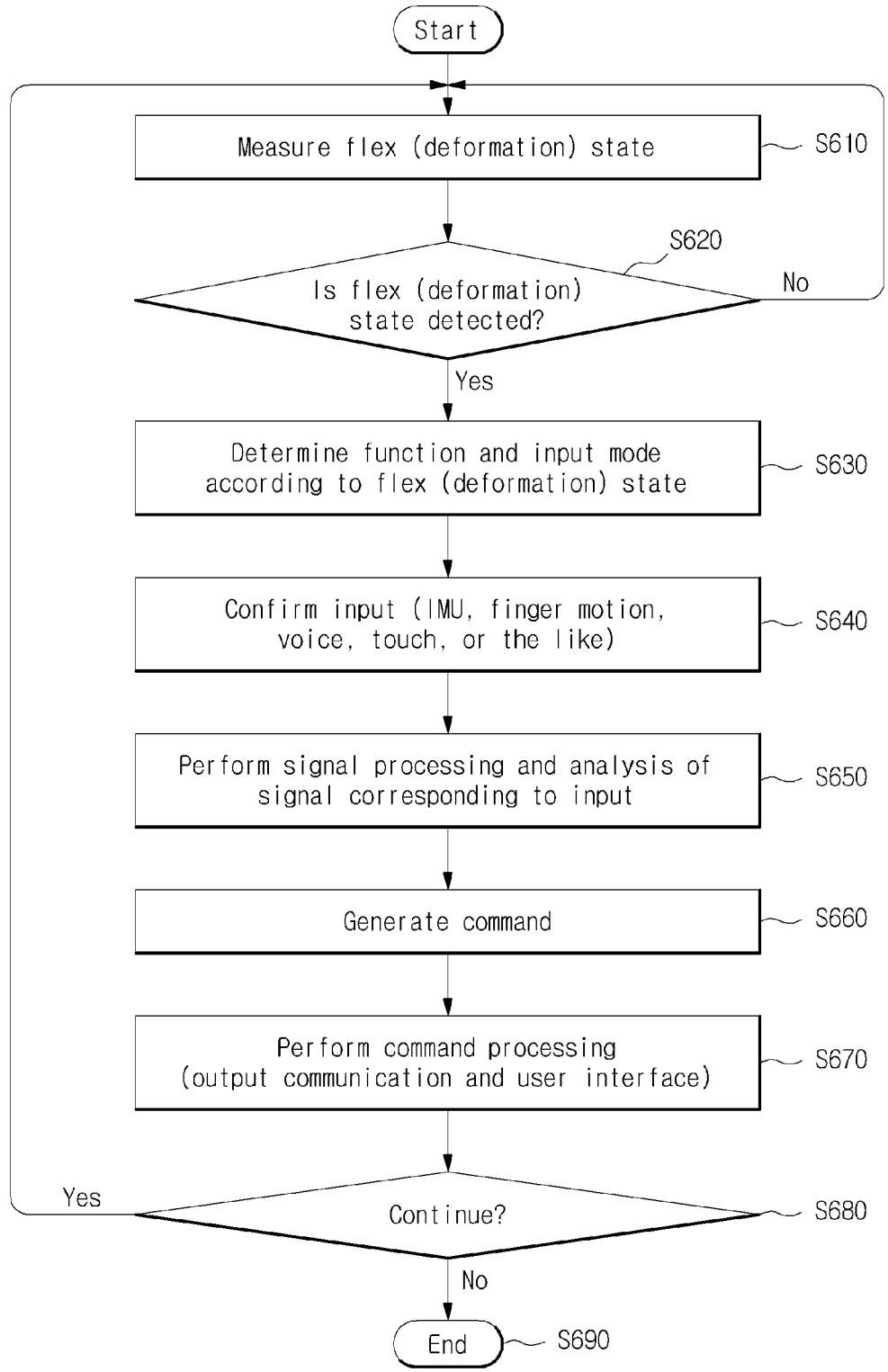

WRIST WEARABLE APPARATUS WITH TRANSFORMABLE SUBSTRATE

CROSS-REFERENCE TO RELATED APPLICATION

This application claims priority to and the benefit of Korean Patent Application No. 10-2014-0012298, filed on Feb. 3, 2014, the disclosure of which is incorporated herein by reference in its entirety.

BACKGROUND

1. Field of the Invention The present invention relates to a wrist wearable apparatus, which is a representative apparatus of a wearable computer.

2. Discussion of Related Art

Advance in information technology and popularization of mobile apparatuses such as smartphones have recently led to interest in various forms of computing apparatuses usable in mobile environments. In particular, wearable computing apparatuses (wearable computers) have attracted public attention as next generation computer apparatuses subsequent to mobile computer apparatuses such as smartphones, and glasses type or watch type wearable apparatuses have recently appeared.

Wrist wearable apparatuses typified by smartwatches enable a user to conveniently use a smartphone without directly accessing the smartphone by realizing some of the functions of smartphones such as text message checking, schedule checking, and the like in a watch type apparatus worn on the user's wrist. Moreover, studies on various applications of uses of wrist watch type apparatuses are actively progressing.

However, despite various attempts at commercialization, the wrist wearable apparatuses that have appeared so far have various problems such as limitations on information output due to small screen sizes, absence of innovative input methods, and limitations on wearing comfort.

As described above, the existing wrist watch type apparatuses are coupled with smartphones to provide functions such as personal schedule checking, text checking, and caller checking. However, such wrist watch type apparatuses can be used only when users wear wrist watch type apparatuses on their wrists. In particular, when a user receives a call, the user has to confirm the caller through wrist watch type apparatuses and take out the coupled smartphone to proceed with the call, which is inconvenient.

SUMMARY OF THE INVENTION

The present invention is directed to a wrist wearable apparatus using a transformable substrate with a form transformed so that the wrist wearable apparatus can be conveniently detached from and attached to a wrist, a user can conveniently carry the apparatus on his or her wrist and use it on or off the wrist as necessary, and functions and user interfaces that are adaptively changed according to mechanical deformation of the apparatus can be provided.

According to an aspect of the present invention, there is provided a wrist wearable apparatus including a transformable substrate configured to have a structure detachable from and attachable to a wrist of a user; a sensor unit configured to include a deformation state detection unit which is able to detect a deformation state of the apparatus; an input and output unit configured to include an input unit such as a button or a touch pad, a video input/output unit such as a camera or a display, and an audio input/output unit such as a microphone or a speaker; a signal processor configured to include a signal processing unit determining an input/output method (user interface) or a function supported by the input/output unit in accordance with the deformation state of the apparatus input by the sensor unit; and a communication processing unit configured to include a communication unit capable of transmitting a document or a command processed by the signal processing unit through communication.

The transformable substrate may also be realized in the form of a slap bracelet (slap wrap) which is a wrist band with a bi-stable spring structure which is commercially sold, may be deformed in shape by an electric or physical method, and further may also be realized by a substrate capable of maintaining a given shape.

The deformation state detection unit may distinguish a flat state, a partially deformed state, and a fully deformed state using a flex sensor with a flexible structure.

The signal processing unit and the communication processing unit may further include a battery and an antenna which are basic elements for signal and communication process driving. The signal processing unit may process all input and output signals input to the apparatus based on programmed documents, may internally include a storage device for the programmed documents, and may be separately provided externally.

The communication processing unit may be coupled with an external apparatus serving as a unit for short-range communication such as Bluetooth and may be directly connected to a wireless communication network such as LTE or CDMA The input/output unit may further include a unit configured to detect an apparatus motion occurring due to a hand motion in order to expand a function of the wrist wearable apparatus. The motion detection unit may be realized with an acceleration sensor or a gyro sensor capable of detecting a motion of the apparatus and may be more preferably realized by an inertial measurement unit (IMU) sensor configured as a combination of the two sensors described above.

The input/output unit may further include a finger motion detection unit in order to expand functions of the wrist wearable apparatus.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 4 is a diagram illustrating another embodiment of the wrist wearable apparatus according to the present invention;

FIG. 6 is a flowchart illustrating the flow of a processing operation of a user interface and a function in a deformation state of the wrist wearable apparatus according to the embodiment.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, exemplary embodiments of the present invention will be described with reference to the appended drawings.

Figure 1:
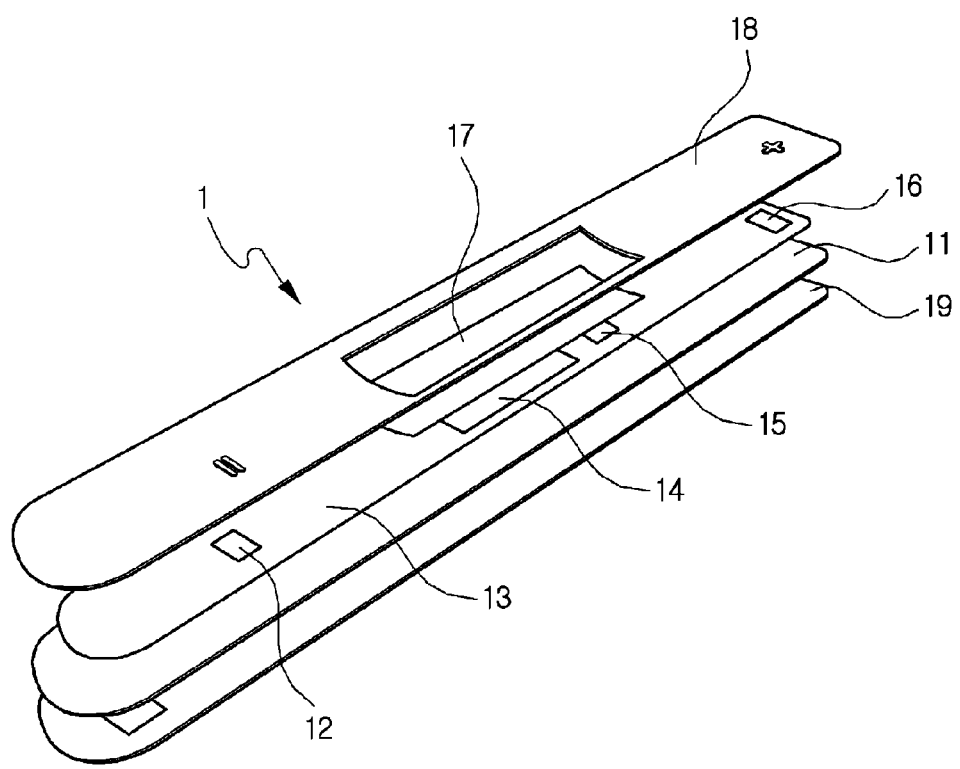
FIG. 1 is a diagram illustrating the configuration of a wrist wearable apparatus according to the present invention.

FIG. 1 is a diagram illustrating the configuration of a wrist wearable apparatus according to the present invention. As illustrated in FIG. 1, a wrist wearable apparatus 1 according to one embodiment of the present invention includes a transformable substrate 11 providing convenience of detaching from and attaching and to a user's wrist. The transformable substrate 11 can be realized based on a slap bracelet (slap wrap), which is a wrist band with a bi-stable spring structure conventionally commercially sold, and other material can also be used. When the wrist wearable apparatus 1 is deformed by the transformable substrate 11, the degree of transformation (for example, a flat state, or a partially deformed state, and a fully deformed state) is detected by a deformation state detection unit 13. The deformation state detection unit 13 can also be realized by a flex sensor, which is commercialized as a normal electronic component. A signal processing unit 14 receives a signal representing the degree of transformation from the deformation state detection unit 13 as an input. It determines a function and/or a user interface based on the degree of transformation and provides it through an input/output unit such as a video output unit 17, an audio input unit 12, or an audio output unit 16. A user performs an intended input utilizing the user interface or the function provided according to the shape deformation of the apparatus to deliver a command or data to another apparatus or a communication network through a communication processing unit 15.

Figure 2:
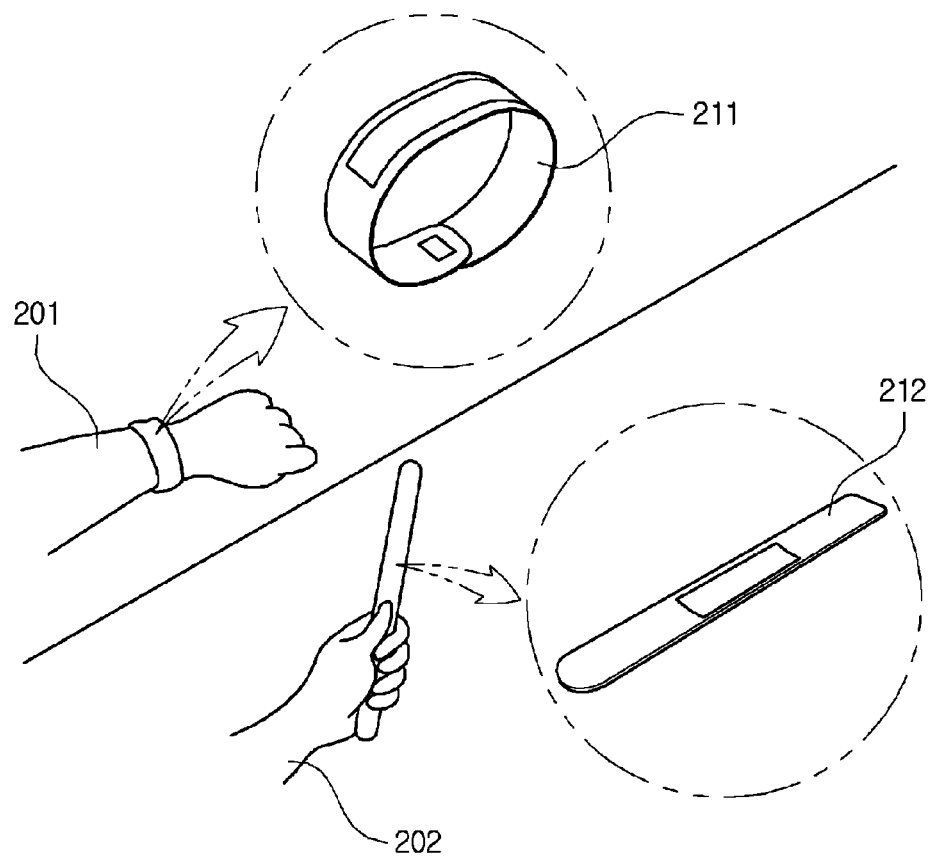
FIG. 2 is a diagram illustrating an embodiment of the wrist wearable apparatus according to the present invention.

FIG. 2 is a diagram illustrating an embodiment of the wrist wearable apparatus according to the present invention. As illustrated in FIG. 2, wrist wearable apparatuses 211 and 212 according to one embodiment of the present invention basically have the structure suggested in FIG. 1, can thus be detachably attached conveniently to a wrist, and can be used when the wrist wearable apparatuses 211 and 212 are worn on hands 201 and 202 or are detached from wrists and gripped by the hands. For example, the wrist wearable apparatuses 211 and 212 can be coupled with smartphones and networks. Users can carry the wrist wearable apparatuses 211 and 212 on their wrists to perform, for example, text message checking, schedule checking, and caller checking, as in smartwatches. When a method of automatically changing a function according to the degree of deformation is used, as suggested in the present invention, the user can confirm a caller while wearing the apparatus on his or her wrist when receiving a call, as shown with the wrist wearable apparatus 211 in FIG. 2. When the user detaches the apparatus from his or her wrist and extends the shape of the apparatus proceed with the call, the wrist wearable apparatus 212 is automatically switched to a calling function and thus the user can conveniently proceed with the call. Thus, when the method suggested in the present invention is used, it is possible to improve the convenience for the user by providing a user interface proper to a situation according to the transformation of the apparatus.

Figure 3:
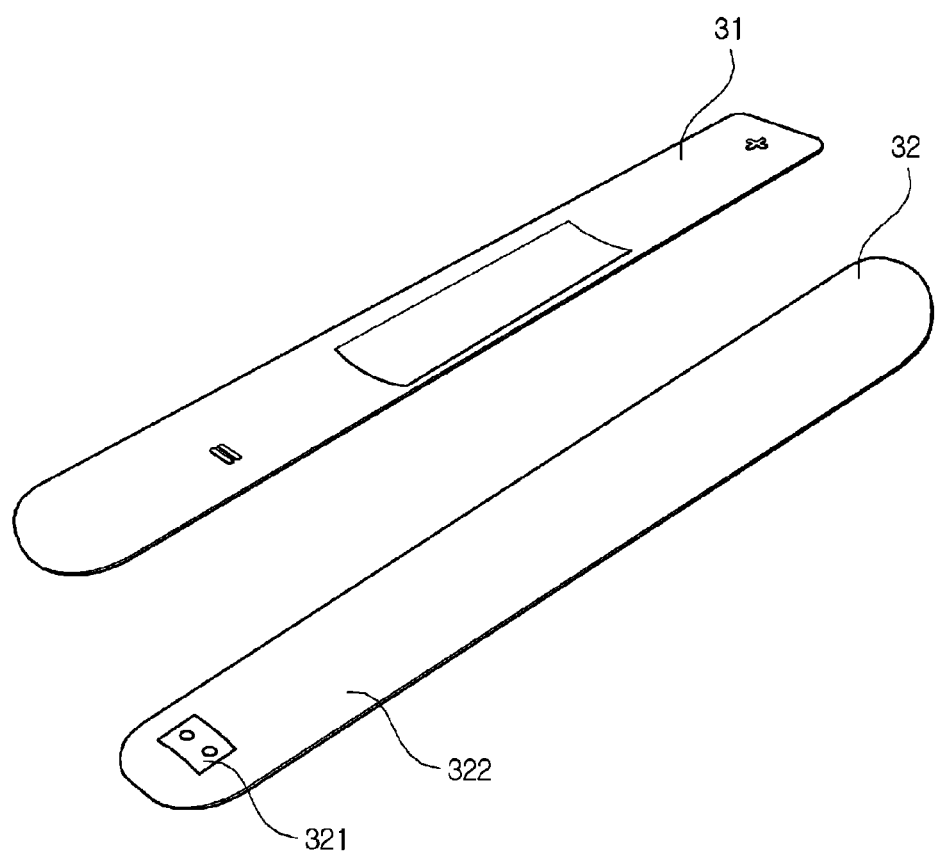
FIG. 3 is a diagram illustrating a configuration added to expand a function of the wrist wearable apparatus according to the present invention.

FIGS. 3 and 4 are diagrams illustrating another embodiment of the wrist wearable apparatus according to the present invention. As illustrated in FIG. 3, when a finger motion detection unit 321 and a motion detection unit 322 are further provided in the structure suggested in FIG. 1, functions are expanded and more convenient user interface methods can thus be provided. At this time, the finger motion detection unit 321 is assumed to use the method disclosed in U.S. Pat. No. 8,292,844, "Finger Motion Detection Apparatus and Method", which are incorporated by reference herein by in its entirety. The motion detection unit 332 can be realized by an acceleration sensor or a gyro sensor capable of detecting a motion of the apparatus and can be more preferably realized by an inertial measurement unit (IMU) sensor configured as a combination of the two sensors described above.

By further providing the two detection units described above, as illustrated in FIG. 4, convenient user interfaces are provided in such a manner that the wrist wearable apparatus according to the present invention performs the function of a wrist wearable apparatus in a deformed state 410 when a user wears the wrist wearable apparatus on his or her wrist, the function of the wrist wearable apparatus is changed to a telephone function in a state 411 in which the wrist wearable apparatus is detached from the wrist and is fully extended, and the function of the wrist wearable apparatus is automatically changed to the function of a digital pen when the user grips the wrist wearable apparatus like a pencil in a partially deformed state 412.

When the user wears the wrist wearable apparatus on his or her wrist in the deformed state 410, the wrist wearable apparatus can be used as a gesture input apparatus as in the method disclosed in US Pat. No. 8,292,844, "Finger Motion Detection Apparatus and Method" by the finger motion detection unit 321 and the motion detection unit 322. For example, when the user swings the apparatus while making a fist to perform call rejection at the time of reception of a call, the call is automatically rejected. When the user makes a fist, the motion can be detected by the finger motion detection unit 321. A signal input from that time by the motion detection unit 322 is analyzed by a signal processing unit and is recognized as a corresponding command. This detection method is disclosed in detail in the US patent of the present inventors, but a finger motion detection unit and a method therefor can be realized according to other methods. In the fully extended state 411 in which the apparatus is detached from the wrist and is fully extended, a current state is sensed by a deformation state detection unit and the function is automatically switched to a telephone function. At this time, when a video output unit is included in the wrist wearable apparatus of the present invention, a screen can be automatically changed according to a gripped state. Further, when the user grips the wrist wearable apparatus and writes numbers input in a telephone number or a name on a surface to perform a telephone call, a corresponding person is called on the telephone.

When the user detaches the wrist wearable apparatus from his or her wrist and flexes and grips a part of the wrist wearable apparatus like a pencil, a current state is sensed by the deformation state detection unit and the function and the user interface are switched so that the wrist wearable apparatus can be used as a digital pen. That is, when the user grips and uses the wrist wearable apparatus as if he or she were writing letters on a surface with a pencil, the letters are automatically recorded in a memo form in the apparatus. At this time, since the finger motion detection unit 321 described above includes an infrared radiation unit and a reflected signal measurement unit as disclosed in the US Patent of the present inventors, and is located at the end of the wrist wearable apparatus according to the present invention, it can be detected that the wrist wearable apparatus comes into contact with the surface. Further, a form of letters can be recognized by recognizing a motion of the apparatus by the motion detection unit 322. This method is the same as an operational principle of an existing IMU sensor-based digital pen, and thus a specific description will not be made.

Figure 5:
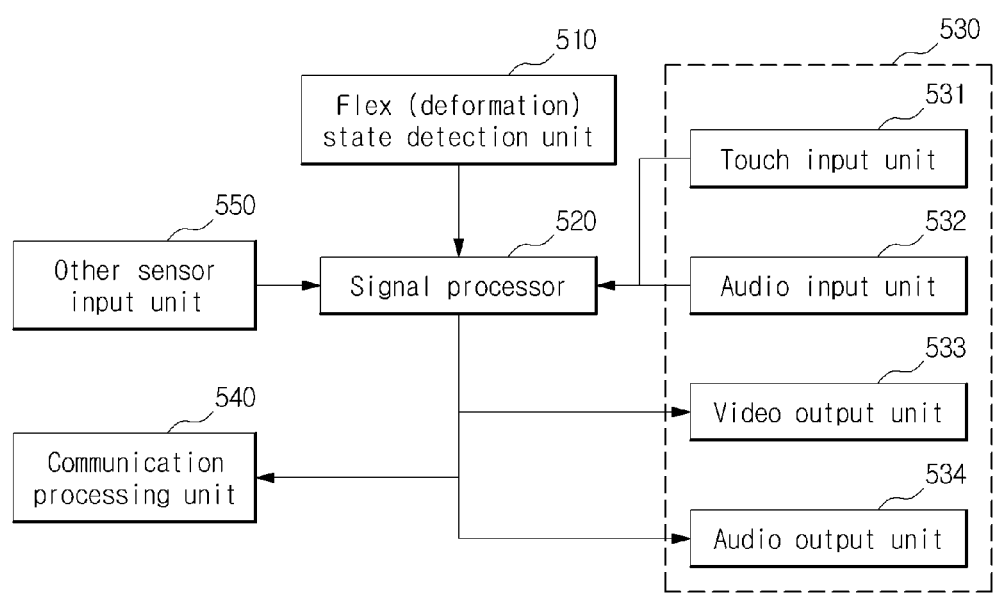
FIG. 5 is a block diagram illustrating the configuration of the wrist wearable apparatus according to an embodiment.

FIG. 5 is a block diagram illustrating the configuration of a wrist wearable apparatus according to an embodiment. Referring to FIG. 5, the wrist wearable apparatus may include a deformation state detection unit 510, a signal processor 520, a user interface unit 530, a communication processing unit 540, and another sensor input unit 550 disposed on a transformable substrate.

The deformation state detection part 510 is disposed on the transformable substrate and outputs a signal corresponding to the degree of transformation when the shape of the transformable substrate is transformed.

The other sensor input unit 550 can include the IMU sensor and the finger motion detection sensor and can be selectively used by a valid input depending on the function decision according to the deformation state in the signal processor.

The signal processor 520 determines a current state of the apparatus by combining a signal input from the deformation state detection unit 510 and a signal from the other sensor input unit 550. For example, functions and user interfaces to be provided such as a telephone call, a gesture pen, and a gesture apparatus are decided by comprehensively determining whether the current state of the apparatus is a state in which the apparatus is worn on a wrist, a state in which the apparatus is removed from the wrist, a state in which the apparatus is partially flexed, a state in which the apparatus is fully extended, or the like.

The user interface unit 530 provides an input according to the decided function and user interface and outputs a result corresponding to a command generated by the signal processor 520 to output units such as the video output unit 533 and the audio output unit 534 based on the command.

The communication processing unit 540 provides connection to another apparatus and transmits a corresponding result based on a command generated by the signal processor 520. FIG. 6 is a flowchart illustrating the flow of a processing operation of a user interface and a function in a deformation state of the wrist wearable apparatus according to the embodiment.

As illustrated in FIG. 6, the wrist wearable apparatus measures a deformation state (S610) through the deformation state detection unit 510 and determines a deformation state or a detachably attached state (S620) by comprehensively determining signals input from the other sensor input unit 550. According to the determined state, a function and an input mode are determined (S630), inputs of the user interface such as the IMU sensor, a finger motion, a voice, and a touch are confirmed based on the determined state (S640), signal processing and analysis corresponding to the input are performed (S650), and a command is generated (S660). Subsequently, a command corresponding to the generated command is transmitted and output through communication and the user interface.

According to the present invention, the wrist wearable apparatus can be detachably attached more conveniently than a wrist wearable apparatus realized in an existing watch form. Thus, a user can conveniently carry the wrist wearable apparatus on his or her wrist and use it on or off the wrist as necessary, thereby resolving inconveniences of carrying and using an existing mobile apparatus.

Further, it is possible to obtain the advantage of providing the user interface adaptively changed according to a detachably attached state and thus providing a new and convenient use method different from an existing apparatus.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus wearable on a wrist of a user comprising:
   a flexible substrate that is flexibly transformable into a plurality of shapes and that is detachably attachable to the wrist of the user;
   a sensor that detects a shape among shapes of the substrate;
   input/output interfaces; and
   a signal processor that switches to an input mode corresponding to an input/output interface among the input/output interfaces, of the input/output interface based on the detected shape of the substrate,
   wherein the input/output interfaces includes any one of an audio input/output, a video input/output, an inertial measurement unit (IMU), and a proximal sensor.

2. The apparatus of claim 1, wherein the substrate is a material having a bi-stable structure or a transformable material.

3. The apparatus of claim 1, wherein the sensor is able to distinguish a flat shape, a partially deformed shape, and a fully deformed shape as the shapes of the apparatus.

4. The apparatus of claim 1, wherein the sensor further detects a detached state from the wrist based upon the detected shape and switches the input mode according to the detached state.

5. The apparatus of claim 1, further comprising a battery and an antenna.

6. The apparatus of claim 1, wherein the signal processor processes signals input into and output from the apparatus.

7. The apparatus of claim 1, further comprising:
   a communication processing unit configured to couple the apparatus with an external apparatus and connect the apparatus directly to a wireless communication network.

8. The apparatus of claim 1, wherein the sensor includes an acceleration sensor or a gyro sensor which is capable of detecting a motion of the apparatus, or an inertial measurement unit (IMU) sensor configured as a combination of the acceleration sensor and the gyro sensor.

9. The apparatus of claim 8, wherein the input/output interfaces further includes a finger motion detector.

* * * * *